United States Patent Office 2,901,702
Patented Aug. 25, 1959

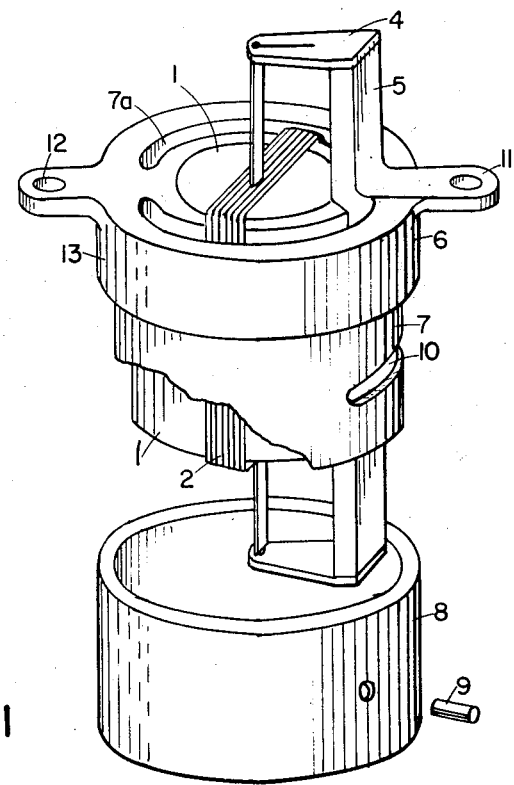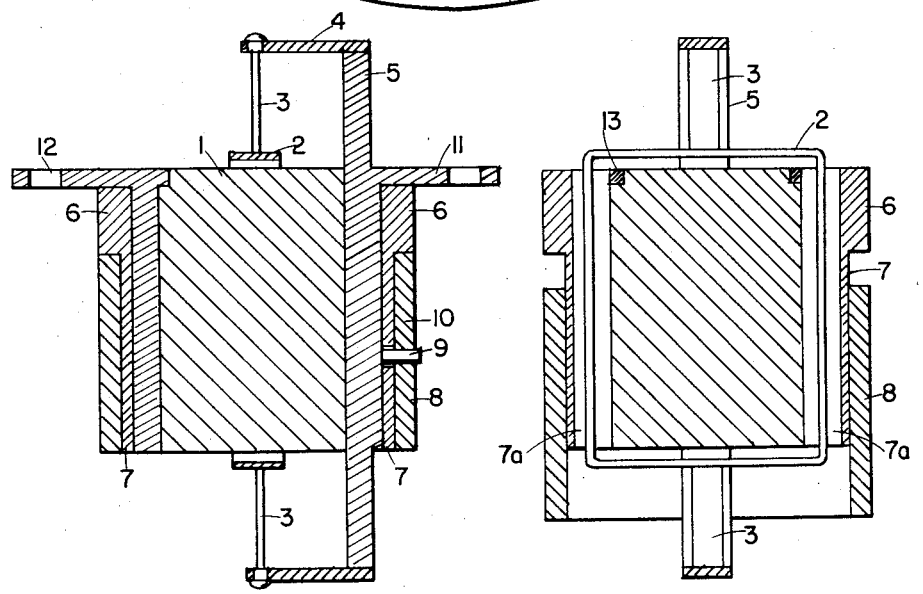
FIG.1
FIG.1a
FIG.1b

2,901,702

MOVING COIL INSTRUMENT WITH CORE MAGNET

Friedrich Endlich, Langen, Hesse, Germany, assignor to Hartmann & Braun Aktiengesellschaft, Frankfurt am Main, Germany, a corporation of Germany Application March 20, 1953, Serial No. 343,571

Claims priority, application Germany March 27, 1952

7 Claims. (Cl. 324—151)

The present invention refers to a moving coil instrument with core magnet, i.e. such a moving coil instrument where the core within the coil is a permanent magnet and where an external magnetic flux return path in the form of a cylinder is provided. The invention specifically relates to a device for adjusting the magnetic field of such a moving coil system.

For moving coil instruments it is desirable that different instruments of the same series have the same sensitivity at the same internal resistance, as then it will easily be possible to interchange the instruments in their installations. Due to the fact that it will not always be possible to manufacture coils with the same internal resistance nor to obtain uniformity of the associated magnets, the instruments must be adjusted during calibration. The alteration of the resistance to the value desired can be carried out by means of series resistances or shunts. When applying this method, however, it will not be absolutely possible to obtain the desired value also for the sensitivity. For adjusting the sensitivity the magnetic field of the instrument must be varied too. For systems with an external magnet this can be obtained by providing a magnetic shunt, that means the two pole pieces, generating the magnetic field in which the moving coil turns, are connected by a movable piece of iron which permits a varying magnetic shunting of the field.

Such a magnetic shunt cannot be provided for a moving coil system with a core magnet, because this shunt ought to be mounted within the turning area of the coil. The present invention specially deals with a device which, useful for core magnet systems, enables a magnetic adjustment where the sensitivity can be set by varying the magnetic field acting on the coil.

The object of the invention is to provide a simple device which will alter the effective magnetic field of the magnet.

A special design provides an iron magnetic flux return path consisting of two parts in the form of rings or tubes, telescoped one into the other and which can be shifted relative to each other. The inner part is so dimensioned that it will be oversaturated by the field originating from the core magnet. In the area not covered by the external ring, the iron magnetic flux return path is then not complete and there a weakening of the magnetic field occurs. Adjustment will now be obtained by shifting correspondingly the external ring. Another design enables the internal ring to be shifted, while the external one remains fixed.

Details of two examples of the invention are shown in the annexed drawing wherein:

Fig. 1 is an exploded perspective of the instrument of the form in which the outer tube is made movable;

Figs. 1a and 1b are both substantially diametric sectional views of the invention in the form as shown in Fig. 1, the section planes being perpendicular to each other;

Figure 2:
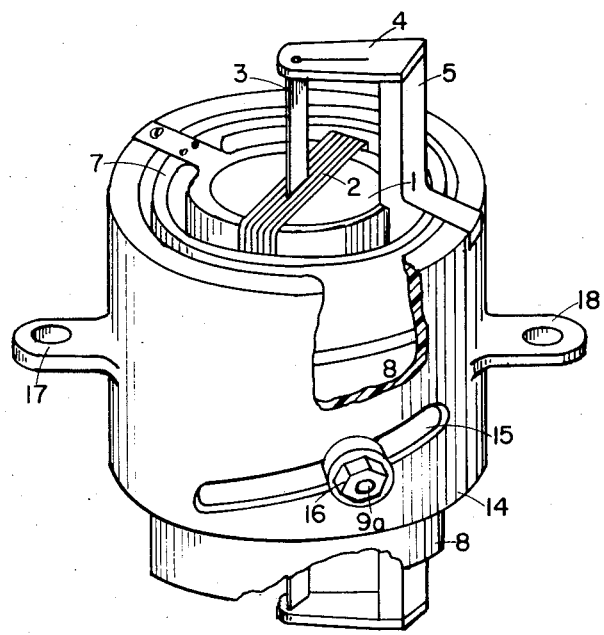
Fig. 2 is a perspective of a modified form of the instrument wherein the outermost tube is fixed.
Figure 2A:
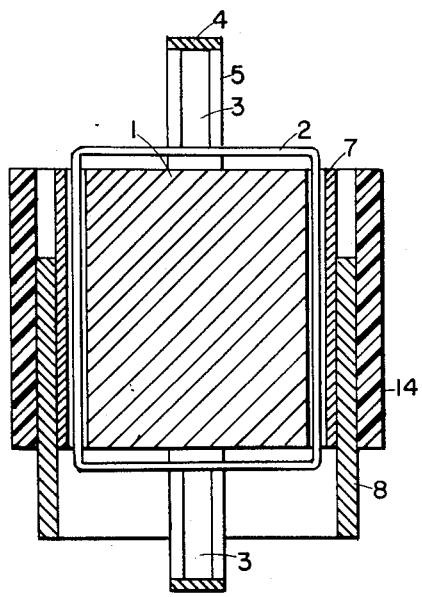
Fig. 2a is a sectional view of the instrument shown in Fig. 2.

In the form of the invention as shown in Fig. 1 No. 1 stands for the magnet. The moving coil 2 is supported by two stretched strips which are tightened by springs 4 fastened on the support 5 of the system.

The magnetic flux return consists of an inner, shouldered iron, part or tube, having a thick walled upper portion 6, and a thin walled lower portion 7, and a thick walled outer iron ring 8 slidably and rotatably attached to the tube and surrounding the lower portion 7. Ring 8 carries a small rod or pin 9 at its inner surface, the pin projecting inwardly into an oblique slot 10 provided in the inner thin walled portion 7. The slot is situated in such a part of ring 7 so as to be beyond the stop area of the moving coil, in order that the field effective on the moving coil be not disturbed by the slot 10. The pointer, being attached to the moving coil in the usual way, is not represented.

By turning the external part 8, the latter is shifted upwards and downwards, and thus the field effective on the moving coil is varied. The thin-walled part 7 of the internal iron magnetic return is so dimensioned that it is oversaturated by the field of the core magnet. The area of oversaturation is varied by shifting part 8. Also support 5 within the airgap is situated beyond the stop area of coil 2. It carries the core, the internal iron magnetic return 6, 7, and is fitted with two projections 11 and 12 for fastening the whole system in the usual housing or case. Part 5 with the projections 11 and 12 is suitably made of die-cast material and die-cast about the core 1 so that the core and support 5 become practically integral. Ring 13 serves as mounting support and is situated at both frontal areas of the core of the magnet.

As is known to those skilled in the art, the core 1 must be transversely magnetized and the core is preferably a permanent magnet.

The coil 2 extends below the thickened portion or shoulder portion 6 and preferably extends to about the bottom of the thin portion 7, swingable in the arcuate spaces 7a between the core and the tube 7. The extent to which the iron ring 8 covers the thin tube, which is thin enough to be supersaturated by the magnet core, governs the field strength in the arcuate spaces 7a. If the ring 8 were removed completely and the tube 7 quite thin, the iron flux path would be mostly in the shoulder 6. As the ring 8 is slipped over the tube 7, the iron flux path is widened from the bottom upwardly so as to increase the strength of the field in which the coil is to turn. In such a manner a desired field strength is obtained.

In the form of the invention as shown in Fig. 2 the thickened portion 6 is omitted, though it need not be, and the stationary magnetic flux return is in the form of only the supersaturated thin tubular portion 7, which preferably extends the major length of the coil 2. The tube 7 is fixed relative to the support 5 as is an outermost shell 14, shown coaxial with the core and spaced from the exterior of the tube 7. The iron ring 8 is disposed intermediate the shell 14 and tube 7. The shell is provided with an oblique or helical slot 15 through which a pin 9a fast on the ring 8 projects. Here the pin 9a is provided with a nut 16 for holding the pin against movement. The external shell 14 can suitably be made of plastic material and the inside covered with brass, in order to obtain an easy sliding of part 8. The shell has two projections 17 and 18 by means of which the whole system is fixed in the case. The housing is understood to be fixed to the support 5.

For this design it is also possible to omit entirely the internal ring 7. In this case the magnetic field will be limited directly by the ring 8. Also the interior of shell 14 can be of iron instead of brass, thus facilitating an external screening also for the part not covered by ring 8. This would represent the design already mentioned above where the iron pass-through consists of two parts fitting into one another, one of these parts being fixed.

I claim:

1. A moving coil instrument comprising a support, a cylindrical permanent magnetic core, magnetized in a direction perpendicular to its axis, and rigidly fixed to the support, a coil surrounding said core in inductive relationship thereto and rotatably mounted to turn on said support coaxially of the core about a transverse axis of the coil, a cylinder of magnetic material surrounding said coil and core coaxially with said axes and having a part magnetically saturated by the core, a magnetic flux return path member consisting of a cylindrical iron ring coaxially surrounding said cylinder and slidable on the saturated part, the ring being rotatable on the cylinder, a rod radially mounted on said iron ring, and means to guide said rod in a direction oblique to the said axes so that rotation of the ring relative to the cylinder produces relative axial movement of the ring and cylinder.

2. A moving coil instrument comprising a support, a cylindrical permanent magnetic core transversely magnetized and rigidly fixed to the support, a coil surrounding said core for magnetic interaction therewith and rotatably mounted on said support to turn about a transverse axis of the coil and coaxially with the core, a magnetic flux return consisting of a cylindrical iron ring coaxial with said coil and core, a cylindrical shell rigidly fixed to the support and surrounding said iron ring allowing the ring to slide and rotate thereon in the shell, a rod mounted radially on said iron ring, and means to guide said rod in a direction oblique to the axis of the ring to cause the ring to move axially when the latter is rotated, the ring being in at least a portion of the magnetic field of the core.

3. A moving coil instrument comprising a support, a cylindrical permanent magnetic core transversely magnetized and rigidly fixed to the support, a coil surrounding said core in inductive relationship thereto and rotatably mounted on said support to turn substantially about a transverse axis of the coil, a cylinder coaxially surrounding said coil and core, a magnetic flux return member consisting of a cylindrical iron ring coaxially surrounding said cylinder and rotatable and slidable upon the cylinder and in the field of the core, a rod mounted on said iron ring, said cylinder being provided with a slot extending in an oblique direction to the axis thereof, said rod protruding into said slot, for obtaining relative axially longitudinal movement between the ring and cylinder by relative rotation of the cylinder and ring to vary the flux transversing at least a part of the coil.

4. A moving coil instrument comprising a support, a cylindrical permanent magnetic core transversely magnetized and rigidly fixed to the support, a coil surrounding said core and rotatably mounted on the support to turn about a transverse axis of the coil coincident with that of the core, a magnetic flux return path member consisting of a cylindrical iron ring coaxial with said coil and core, a cylindrical shell rigidly fixed to the support and surrounding said iron ring allowing the ring to slide and rotate in the shell, a rod protruding radially out of said iron ring, said shell being provided with a slot extending in an oblique direction to the axis, said rod protruding into said slot so that relative rotation of the shell and ring produce relative axial movement thereof.

5. A moving coil instrument comprising a permanent magnetic cylindrical core transversely magnetized and rigidly fixed to a support, a coil surrounding said core in inductive relationship thereto, and rotatably mounted on said support to turn about a transverse axis of the coil coincident with that of the core, a magnetic flux return path member comprising a thin walled iron tube thin enough to be saturated by said core and in the field thereof and an iron ring having a wall thicker than that of the tube, said iron ring being axially movable in the field of the core and rotatable upon said tube, and a housing of non-magnetic material surrounding and for guiding said iron ring.

6. A moving coil instrument comprising a support, a cylindrical permanent magnetic core transversely magnetized, a coil around the core in inductive relationship therewith and mounted on the support for turning about a transverse axis of the coil coincident with the axis of the core, two tubular members, one within the other and coaxial with the core and rotatable and slidable with respect to each other, one of said members being fast on the support, at least one of the members being of iron, and having at least a part disposable in the flux field emanating from said core for varying the strength of the field of the core in the zone of the coil, and means for holding the members together and for converting relative rotary motion of the members to at least partial relative axially longitudinal motion of the members, for adjusting field strength at the coil by relative rotation of the members.

7. A moving coil instrument comprising a support, a cylindrical permanent magnetic core transversely magnetized, rigidly fixed to the support, a coil surrounding said core in inductive relationship thereto and rotatably mounted on said support to turn about a transverse axis of the coil, a cylindrical member carried on the support and coaxially surrounding said coil and core, a magnetic flux return member consisting of a cylindrical iron member coaxial with the cylindrical member, one member surrounding the other and slidable thereon and in the field of the core, a rod mounted on one of said members, the other member being provided with a slot extending in an oblique direction to the axis thereof, said rod protruding into said slot, for obtaining relative axially longitudinal movement between the members by relative rotation of the member to vary the flux traversing at least a part of the coil.

References Cited in the file of this patent

UNITED STATES PATENTS

| 1,920,764 | Nickle | Aug. 1, 1933 |
| 2,102,409 | Faus | Dec. 14, 1937 |
| 2,607,812 | Lederer | Aug. 19, 1952 |
| 2,816,255 | Greif | Dec. 10, 1957 |

FOREIGN PATENTS

| 891,979 | France | Dec. 17, 1943 |